Feb. 10, 1942.  C. SAURER  2,272,900
RESILIENT CONNECTOR
Filed Nov. 8, 1940
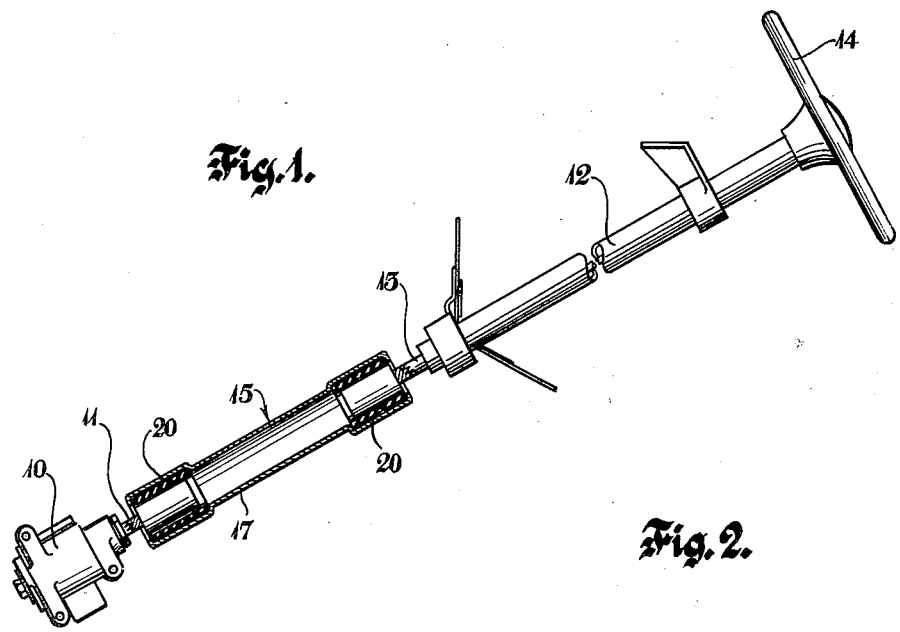
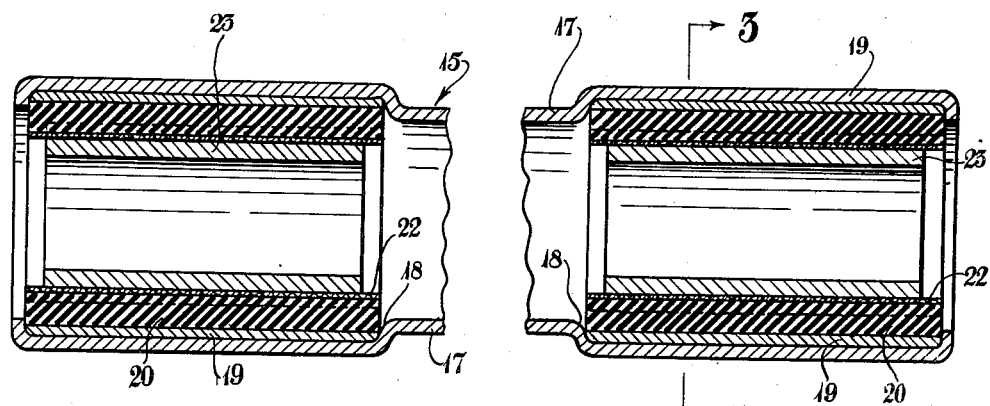
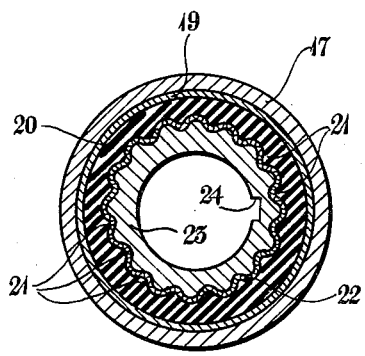
INVENTOR
Curt Saurer
BY
Ely & Frye
ATTORNEYS Patented Feb. 10, 1942

2,272,900

UNITED STATES PATENT OFFICE 2,272,900

RESILIENT CONNECTOR

Curt Saurer, Akron, Ohio, assignor to The Firestone Tire & Rubber Company, Akron, Ohio, a corporation of Ohio Application November 8, 1940, Serial No. 364,890

5 Claims. (Cl. 64—11)

This invention relates to resilient connectors, and more especially it relates to resilient connectors for coupling the steering column of a motor vehicle to the stub shaft of the steering wheel gear box of the vehicle.

The chief objects of the invention are to facilitate the assembly of the body and the frame of a motor vehicle; to make driving less tiresome by absorbing vibration in the steering column; and to provide a connector of the character mentioned that compensates for slight mis-alignment of the connected elements. Other objects will be manifest as the description proceeds.

Of the accompanying drawing:

Figure 1 is a side elevation of a steering assembly comprising the improved resilient connector, the latter being shown in section;

Figure 2 is a diametric longitudinal section of the improved connector, on a larger scale; and Figure 3 is a section on the line 3—3 of Figure 2.

Referring first to Figure 1 of the drawing, there is shown a steering assembly comprising the usual gear box 10 that is carried by the frame of the vehicle, a stub shaft 11 operatively connected with the gearing in said gear box and projecting obliquely upwardly therefrom, a steering post 12 carried by the vehicle body and extending into the driver's compartment, a steering column 13 journaled in the post 12 and projecting from both ends thereof, in axial alignment with the stub shaft 11, a steering wheel 14 mounted upon the upper end of column 13, and a resilient connector, designated as a whole by the numeral 15, connecting the lower end of the steering column 13 to the upper end of the stub shaft 11.

As shown in Figures 2 and 3, the connector 15 comprises a tubular metal shell or casing 17 that has a slightly constricted medial portion which provides shoulders 18, 18 interiorly thereof at spaced points from its respective ends. Mounted in each end portion of the shell 17 is a rubber and metal structure comprising a metal sleeve 19, and a rubber cushion body 20 bonded by vulcanization to the inner surface of said sleeve. The inner circumference of the rubber body 20 is formed with longitudinally extending corrugations or flutes 21, 21 and the latter are faced with fabric 22 that is bonded to the rubber body 20. Said fabric 22 is impregnated with a suitable lubricant, such as an admixture of castor oil and graphite. Received within the rubber body 20 is a tubular bushing 23, the perimeter of the latter being longitudinally corrugated or fluted, complementally of the flutes 21 of the rubber body 20, so as to interfit therewith. Because the fabric facing 22 is lubricated, the bushing 23 may slip axially relatively thereof, but is restrained from angular movement relatively of the rubber body 20 by reason of the interengaged flutes. The bushing 23 is of such size as to receive therein the end portion of the steering column 13 or stub shaft 11, the axial bore of the bushing being formed with a keyway 24, Figure 3, by means of which said steering column or stub shaft may be non-rotatably keyed thereto.

The two rubber and metal structures in the shell 17 are of identical construction so that the foregoing description of one of them will suffice for both. The rubber and metal structures fit within the end portions of the shell 17 in abutting relation to the shoulders 18 therein, the ends of the shell projecting slightly beyond the ends of the rubber and metal structures and being crimped over the ends thereof, with the result that relative longitudinal movement of said structures axially of the shell 17 is prevented. Furthermore, the sleeves 19 of the rubber and metal structures have a force fit within the shell 17 so that relative angular movement between the said elements is prevented.

The resilient connector readily is connected to the stub shaft 11 and steering column 13 during the assembly of the vehicle, and due to the resilient nature of the rubber bodies 20, no inconvenience is caused by slight non-alignment of said stub shaft and column. The connector insulates the steering wheel against shocks and jars to which the vehicle body normally is subjected during use, and because elements of the connector are movable axially of each other, it readily adapts itself to relative movement between the frame and body of the vehicle, such as occurs when there is resilient insulation between the same.

Modification may be resorted to without departing from the spirit of the invention, or the scope thereof as defined by the appended claims.

What is claimed is:

1. In a resilient connector of the character described, the combination of a tubular shell, tubular rubber cushions mounted in the respective ends thereof and secured against rotary movement relatively thereof, and respective tubular metal bushings mounted within each of said rubber cushions and movable relatively thereof in an axial direction while restrained against rotary movement relatively thereof, said bushings being attachable to the adjacent ends of respective aligned shafts.

2. In a resilient connector of the character described, the combination of tubular metal shell, tubular rubber cushions mounted in the respective ends thereof and secured against rotary movement relatively thereof, and respective tubular metal bushings mounted within each of said rubber cushions and attachable to the adjacent ends of respective aligned shafts, said rubber cushions and metal bushings being formed with complemental, longitudinally extending, interengaged corrugations preventing relative angular movement between cushions and bushings.

3. A combination as defined in claim 2 including a layer of lubricated material bonded to the respective rubber cushions between the latter and the metal bushings.

4. In a resilient connector of the character described, the combination of a tubular metal shell, tubular metal sleeves mounted in the respective ends thereof and secured against movement with relation thereto, tubular rubber facings vulcanized to the inner faces of the respective sleeves, and respective tubular metal bushings mounted axially within each of said rubber facings and having interlocking engagement therewith against relative rotary movement, and being movable relatively of the facings in an axial direction.

5. A combination as defined in claim 4 wherein the metal shell has a slightly constricted medial portion defining internal shoulders against which the inner ends of the metal sleeves abut, and the outer ends of the shell are folded over the outer ends of said sleeves.

CURT SAURER.